United States Patent [19]

Köhler et al.

[11] Patent Number: 5,747,589
[45] Date of Patent: May 5, 1998

[54] PROCESS FOR THE PRODUCTION OF POLYCARBONATE-POLYISOBUTYLENE BLOCK COCONDENSATES

[75] Inventors: Burkhard Köhler; Wolfgang Ebert, both of Krefeld; Klaus Horn, Dormagen; Richard Weider, Leverkusen; Thomas Scholl, Bergisch Gladbach, all of Germany

[73] Assignee: Bayer AG, Leverkusen, Germany

[21] Appl. No.: 815,905

[22] Filed: Mar. 12, 1997

Related U.S. Application Data

[63] Continuation of Ser. No. 458,278, Jun. 2, 1995, abandoned.

[30] Foreign Application Priority Data

Jun. 14, 1994 [DE] Germany .................. 44 20 656.9

[51] Int. Cl.⁶ .................. C08G 81/02; C08G 64/18

[52] U.S. Cl. .................. 525/146; 525/92 E; 525/152; 525/468

[58] Field of Search .................. 525/90, 146, 152, 525/468, 92 E

[56] References Cited

U.S. PATENT DOCUMENTS

| | | | |
|---|---|---|---|
| 4,798,873 | 1/1989 | Meurer et al. | 525/146 |
| 4,845,158 | 7/1989 | Peters. | 525/146 |
| 5,525,674 | 6/1996 | Ebert et al. | 525/146 |

*Primary Examiner*—Mark L. Warzel
*Attorney, Agent, or Firm*—Connolly and Hutz

[57] ABSTRACT

The present invention provides a process for the production of polycarbonate-polyisobutylene block cocondensates from thermoplastic aromatic polycarbonates and reactive polyisobutylenes in the melt, as well as mixtures of the block cocondensates with non-reactive polyisobutylenes.

3 Claims, No Drawings

PROCESS FOR THE PRODUCTION OF POLYCARBONATE-POLYISOBUTYLENE BLOCK COCONDENSATES

This is a continuation of application Ser. No. 08/458,278, filed Jun. 2, 1995, now abandoned.

The present invention provides a process for the production of polycarbonate-polyisobutylene block cocondensates from thermoplastic aromatic polycarbonates and reactive polyisobutylene, which is characterized in that thermoplastic polycarbonates with mean weight-average molecular weights $\overline{M}_w$ (determined by gel permeation chromatography) of 8000 to 200,000, preferably of 12,000 to 80,000, and reactive polyisobutylenes with $\overline{M}_n$ (number-average molecular weights determined by gel chromatography or end-group analysis) of 800 to 12,000, preferably of 1200 to 7000, are mixed and fused at temperatures of 220° C. to 380° C., preferably of 250° C. to 340° C., in suitable apparatuses for between 0.5 minutes and 20 minutes, preferably between 1 minute and 5 minutes, or are mixed by dissolution of the reactants in suitable solvents at temperatures between 15° C. and 200° C., preferably between 20° C. and 140° C., and the solvents are vaporized on the stripper-extruder and the mixture obtained is fused at temperatures of 220° to 380° C., preferably of 250° C. to 340° C., for between 0.5 minutes and 20 minutes, preferably between 1 minute and 5 minutes.

The ratios of the reactants, namely the ratios of reactive polyisobutylene to polycarbonate, are between 1:200 and 1:1.5, preferably between 1:50 and 1:4.

Suitable apparatuses are kneaders and extruders.

Suitable solvents are halogenated hydrocarbons for the thermoplastic polycarbonate component and halogenated and halogen-free hydrocarbons for the polyisobutylene component. Examples are $CH_2Cl_2$, chlorobenzene and solvent naphthas.

The thermoplastic aromatic polycarbonates suitable as starting materials are the customary ones based on diphenols, such as are used and can be used in technology. They are also known in the literature (see for example the monograph "Chemistry and Physics of Polycarbonates", H. Schnell, Interscience Publishers, New York, 1964).

Diphenols are for example dihydroxybenzenes, dihydroxybiphenyl, dihydroxydiphenyl ethers, dihydroxydiphenyl sulphide, dihydroxydiphenyl sulphone, dihydroxydiphenylmethane (bisphenol F), dihydroxydiphenylpropane (bisphenol A), dihydroxydiphenylcyclohexane (bisphenol Z), 3,3,5-trimethyl-1,1-(dihydroxydiphenyl)cyclohexane, α,α'-(dihydroxyphenyl)diisopropylbenzenes, dihydroxybenzophenone or mixtures of these aromatic dihydroxy compounds, preferably bisphenol A, bisphenol Z, dihydroxydiphenylmethane and 3,3,5-trimethyl-1,1-(dihydroxydiphenyl)cyclohexane. Bisphenol A is especially preferred.

The polycarbonates used as starting materials have mean weight-average molecular weights $\overline{M}_w$ (weight average, determined for example by gel permeation chromatography) of 8000 to 200,000, preferably 12,000 to 80,000. The molecular weights can also be established in known manner by determination of the relative viscosity in $CH_2Cl_2$ at 25° C. and a concentration of 0.5 wt %. Polycarbonates preferably to be modified are the aromatic thermoplastic polycarbonates that preferably are produced from at least one of the diphenols listed below. These are 4,4,-dihydroxydiphenyl,
2,2-bis(4-hydroxyphenyl)propane (bisphenol A),
2,4-bis(4-hydroxyphenyl)-2-methylbutane,
1,1-bis(4-hydroxyphenyl)cyclohexane,
α,α'-bis(4-hydroxyphenyl)-p-diisopropylbenzene,
2,2-bis(3-chloro-4-hydroxyphenyl)propane,
2,2-bis(3,5-dichloro-4-hydroxyphenyl)propane,
2,2-bis(3,5-dibromo-4-hydroxyphenyl)propane and
1,1-bis(4-hydroxyphenyl-3,3,5-trimethylcyclohexane.

The polycarbonates to be modified according to the invention can also be branched in the customary way by the incorporation of three or more as trifunctional compounds.

Reactive polyisobutylenes, also known as telechelic polyisobutylenes (for the term "Telechele", see Römpp Chemi Lexikon, 9th Edition, Volume 6, page 4485) are known or producible by known methods (see for that purpose for example DE-OS 4 122 655 (Le A 28 403), U.S. Pat. No. 5,274,182, DE-OS 3 618 378 (Le A 24 330) and EP-0 305 718).

Suitable reactive groups of the polyisobutylenes are OH groups, carboxyl groups, primary amino groups and secondary amino groups.

Preferred reactive polyisobutylenes are those of formula (I)

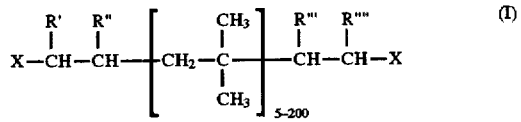

where R', R", R'" and R"" represent hydrogen or a $C_1$–$C_3$ alkyl group and at least two of these groups R' to R"" denote hydrogen and X is OH, $NH_2$ or NH—$C_1$–$C_{16}$-alkyl.

Other suitable reactive polyisobutylenes are those of formula (II)

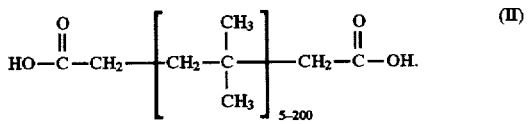

Starting materials for the production of the reactive polyisobutylenes are not, however, the pure polymers of isobutylene

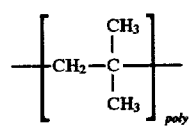

but rather commercially obtainable so-called butyl rubbers, that is polymers that are obtainable by copolymerization of isobutylene with 0.3 to 15 mol %, relative to 1 mole of isobutylene monomer, of a conjugated $C_4$–$C_{14}$ diene, optionally substituted in the 2 or 3 position but containing hydrogen in at least one of the 2 or 3 positions, such as for example butadiene, isoprene, 2-chloro-1,4-butadiene, 2-bromo-1,4-butadiene, pentadiene, hexadiene, 2-ethyl-1,3-butadiene, 2-propyl-1,3-butadiene, 2-phenyl-1,3-butadiene, 2-methyl-1,3-pentadiene or 3-propyl-1,3-hexadiene. In these cases the diene is present linked essentially in the 1,4-position. Small proportions of 1,2-linking, as occur in all commercially available butyl rubbers and cannot be completely suppressed, lead to likewise small proportions of functional side groups and therefore to such telechelic polymers with somewhat more than 2 functional groups per polymer chain, for example up to 2.5 functional groups, preferably up to 2.2. The preferred diene is isoprene. The production of butyl rubbers is described for example in U.S. Pat. No. 2,356,128.

From DE-OS 1 162 559 a process for the production of polycarbonate polyolefin block copolymers is known, wherein, however, the polyolefin blocks are incorporated via the chloroformic acid esters.

According to DE-OS 3 618 378 (Le A 24 330), the polyolefin carboxylic acids are converted to begin with into the acid halides and then reacted with polycarbonates containing OH groups.

According to EP-0 305 718 the polyisobutylenes containing carboxyl groups are processed among other things after transesterification or interesterification to polycarbonate-polyisobutylene block copolymers (Page 6, lines 13–19 of EP-0 305 718). Details of this are not, however, given.

It was surprising on the other hand that the process according to the invention leads to almost complete conversion in relatively short reaction times. As a matter of fact the modified polycarbonates obtained according to the reaction, that is the polycarbonate-polyisobutylene block cocondensates, after extraction with aliphatic hydrocarbons such as n-hexane lose at the most 5 wt % of the reactive polyisobutylene used in each case.

The polycarbonate-polyisobutylene block cocondensates obtainable by the process according to the invention are isolated in known manner from the particular melt by cooling and granulation.

The polycarbonate-polyisobutylene block cocondensates obtainable by the process according to the invention have a useful property pattern, namely an improved stress crack resistance and a good low-temperature toughness.

They can consequently be used in the automobile field owing to their gasoline resistance.

The block cocondensates obtainable according to the invention can be processed to any moulded bodies, for example by extrusion to films, semi-finished products, tubes and boxes.

Before the processing of the block cocondensates obtainable according to the invention, there can be added to them in addition the customary additives for polycarbonates, such as for example thermal stabilizers (phosphites) and UV stabilizers (benzotriazoles), but also the customary additives for polyisobutylenes, such as sterically hindered phenols, in the customary amounts for polycarbonates or for polyisobutylenes of 0.1 to 2 wt %.

To the polycarbonate-polyisobutylene block cocondensates obtainable according to the invention there can also be added still non-reactive polyisobutylenes for further modification.

The invention therefore also provides mixtures of

A) 75–99 wt %, preferably 85–97 wt %, of the polycarbonate-polyisobutylene block cocondensates obtainable according to the invention and B) 1–25 wt %, preferably 3–15 wt %, of non-reactive polyisobutylenes.

Polyisobutylenes according to component B) of the present invention are cationic polymers of olefins and optionally dienes with an isobutylene content of at least 85%. Polyisobutylenes are described under the key word "Polyisobutylenes" on page 3539, volume 5, in Römpp Chemie Lexikon, 9th Edition, 1992, Georg Thieme Verlag. The molecular mass of the polyisobutylenes to be used according to the invention is 1000 to 5,000,000, preferably 10,000 to 1,200,000, g/mol. This is determined by light scattering.

Dienes suitable as comonomers for isobutylene are for example butadiene, isoprene, 2-chloro-1,4-butadiene, 2-bromo-1,3-butadiene, pentadiene, hexadiene, 2-ethyl-1,3-butadiene, 2-propyl-1,3-butadiene, 2-phenyl-1,3-butadiene, 2-methyl-1,3-butadiene and 3-propylhexadiene. Other suitable olefinic comonomers are styrene, α-methylstyrene, m/p-methylstyrene and divinylbenzene.

These mixtures are produced in turn via the melt at temperatures of 220° C. to 380° C.

With regard to isolation of these mixtures according to the invention, the processing of these mixtures according to the invention and the technical applicability of these mixtures, the comments made above on the polycarbonate-polyisobutylene block cocondensates hold true.

EXAMPLE 1

100 g of an essentially difunctional methylamino-terminated telechelic polyisobutylene with an NH number of 29, obtainable according to Example 5 of DE-OS 4 122 655 or of U.S. Pat. No. 5 274 182, are dissolved in 900 g of chlorobenzene and 1900 g of homopolycarbonate from 2,2-bis(4-hydroxyphenyl)propane with a $\eta^{rel}$ (measured in $CH_2Cl_2$ at 25° C. and a concentration of 0.5 g in 100 ml $CH_2Cl_2$) of 1.28 are dissolved in a mixture of 3 l of chlorobenzene and 8 l of $CH_2Cl2$, and the solutions are mixed and evaporated in a stripper-extruder (ZSK 32 with vacuum head) at 280° C. The modified polycarbonate obtained has the following properties: ductile-brittle transition of the fracture in the notched-bar impact test at −20° C. A bar of dimensions 80×10×4 mm is stretched to a peripheral-fibre elongation of 0.6% and exposed for 2 min. to a mixture of equal parts of isooctane and toluene. The specimen shows no cracks. The colour of the compound is light brown to brown.

We claim:

1. A process for the production of polycarbonate-polyisobutylene block cocondensates from thermoplastic polycarbonates and reactive polyisobutylene reactive with the polycarbonates, wherein thermoplastic polycarbonates with mean weight-average molecular weights $\overline{M}_w$ (determined by gel permeation chromatography) of 8000 to 200,000 and reactive polyisobutylenes of formula (I)

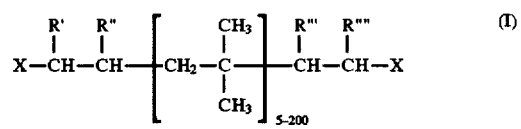

where R', R", and R'" and R"" represent hydrogen or a $C_1$–$C_3$ alkyl group and at least two of these groups R' to R"" denote hydrogen and X is OH, $NH_2$, or NH-$C_1$–$C_{16}$-alkyl, and with $\overline{M}_n$ (number-average molecular weights determined by gel chromatography or by end group analysis) of 800 to 12,000, are mixed and fused at temperatures of 220° C. to 380° C. for between 0.5 minutes and 20 minutes, or are mixed by dissolution of the reactants in suitable solvents at temperatures between 15° C. and 200° C. and the solvents evaporated on a stripper-extruder and the mixture obtained fused at temperatures of 220° C. to 380° C. for between 0.5 minutes and 20 minutes.

2. The process of claim 1, wherein in reactive isobutylenes of formula (I), X represents $NH_2$ or NH—$C_1$–$C_{16}$ alkyl.

3. A mixture of

A) 75–99% by weight of polycarbonate-polyisobutylene block cocondensates prepared as claimed in claim 2; and B) 1–25% by weight of non-reactive polyisobutylenes.

* * * * *